US012000188B2

(12) United States Patent
Schmid

(10) Patent No.: US 12,000,188 B2
(45) Date of Patent: Jun. 4, 2024

(54) FURNITURE FITTING

(71) Applicant: Julius Blum GmbH, Hoechst (AT)

(72) Inventor: Malte Schmid, Bodolz (DE)

(73) Assignee: JULIUS BLUM GMBH, Hoechst (AT)

( * ) Notice: Subject to any disclaimer, the term of this patent is extended or adjusted under 35 U.S.C. 154(b) by 258 days.

(21) Appl. No.: 17/567,354

(22) Filed: Jan. 3, 2022

(65) Prior Publication Data

US 2022/0120123 A1 Apr. 21, 2022

Related U.S. Application Data

(63) Continuation of application No. PCT/AT2020/060242, filed on Jun. 15, 2020.

(30) Foreign Application Priority Data

Jul. 10, 2019 (AT) .............................. A 50628/2019

(51) Int. Cl.
*E05D 3/06* (2006.01)
*E05F 1/10* (2006.01)

(52) U.S. Cl.
CPC ................ *E05D 3/06* (2013.01); *E05F 1/105* (2013.01); *E05Y 2900/20* (2013.01)

(58) Field of Classification Search
CPC .. E05D 3/06; E05D 15/40; E05D 7/00; E05D 11/00; E05F 1/105; E05F 1/1058;
(Continued)

(56) References Cited

U.S. PATENT DOCUMENTS 4,938,108 A * 7/1990 Mekler ................. B25B 13/485 411/407
5,365,639 A * 11/1994 Lewkoski ............. E05D 7/0423 296/76

(Continued)

FOREIGN PATENT DOCUMENTS

CN 1484504 3/2004
CN 106388269 2/2017

(Continued)

OTHER PUBLICATIONS

International Search Report issued Sep. 14, 2020 in International (PCT) Application No. PCT/AT2020/060242.

*Primary Examiner* — Hanh V Tran
(74) *Attorney, Agent, or Firm* — WENDEROTH, LIND & PONACK, L.L.P.

(57) ABSTRACT

A furniture fitting includes a carrier having a substantially flat fastening surface configured to be fixed to a furniture part, an actuating portion configured to be moved relative to the carrier, and an adjustment device for adjusting a position of the actuating portion relative to the carrier, and the adjustment device has at least one actuating element rotatable about a rotational axis. The actuating portion can be adjusted relative to the carrier by exerting a torque to the actuating element, and the rotational axis of the actuating element encloses an angle larger than 0° and smaller than 90° to the fastening surface of the carrier. The actuating element is coupled to the actuating portion via an angularly-movable coupling device, and the angularly-movable coupling device preferably comprises a ball joint.

20 Claims, 6 Drawing Sheets

(58) Field of Classification Search
CPC .......... E05F 5/06; E05F 5/08; E05Y 2900/20; E05Y 2201/474; E05Y 2201/492; E05Y 2201/636; E05Y 2201/638; E05Y 2600/12; E05Y 2600/20; E05Y 2600/32; A47B 95/00; A47B 95/02; A47B 96/20
See application file for complete search history.

(56) References Cited

U.S. PATENT DOCUMENTS

| | | | | |
|---|---|---|---|---|
| 5,755,011 | A | 5/1998 | Green et al. | |
| 6,820,563 | B2 | 11/2004 | D'Urbino et al. | |
| 7,500,287 | B2 | 3/2009 | Brüstle | |
| 7,810,213 | B2 | 10/2010 | Brüstle | |
| 7,887,147 | B2 | 2/2011 | Karg | |
| 7,971,691 | B2 | 7/2011 | Holzapfel | |
| 9,506,283 | B2 | 11/2016 | Folie | |
| 9,803,405 | B2 | 10/2017 | Zetti | |
| 10,415,292 | B2 | 9/2019 | Hammerer | |
| 10,590,688 | B2 | 3/2020 | Salice | |
| 10,914,106 | B2 * | 2/2021 | Salice | E05F 3/104 |
| 2004/0069191 | A1 | 4/2004 | D'Ubrino et al. | |
| 2006/0220284 | A1 | 10/2006 | Holzapfel | |
| 2007/0124893 | A1 * | 6/2007 | Brustle | E05F 5/02 16/296 |
| 2008/0048538 | A1 | 2/2008 | Karg | |
| 2009/0064457 | A1 | 3/2009 | Brustle | |
| 2011/0048180 | A1 * | 3/2011 | Chen | B25B 23/0021 81/177.85 |
| 2012/0000304 | A1 * | 1/2012 | Hamminga | E05F 15/622 74/89.23 |
| 2012/0227678 | A1 * | 9/2012 | Milani | A01K 1/04 119/712 |
| 2014/0215761 | A1 * | 8/2014 | Zetti | E05D 3/16 16/288 |
| 2015/0361705 | A1 * | 12/2015 | Folie | A47B 96/00 74/99 R |
| 2016/0003276 | A1 * | 1/2016 | Møller Hansen | A47B 95/00 403/116 |
| 2017/0204645 | A1 * | 7/2017 | Lubetz | F16H 25/18 |
| 2017/0241176 | A1 | 8/2017 | Zetti | |
| 2018/0058123 | A1 | 3/2018 | Salice | |
| 2018/0209193 | A1 | 7/2018 | Hammerer | |
| 2018/0290214 | A1 * | 10/2018 | Giffin | B23B 31/1173 |
| 2019/0242167 | A1 | 8/2019 | Salice | |
| 2023/0272655 | A1 * | 8/2023 | Baldreich | E05F 1/1058 49/381 |

FOREIGN PATENT DOCUMENTS

| | | | | |
|---|---|---|---|---|
| CN | 107208440 | | 9/2017 | |
| DE | 4207295 | A1 * | 9/1993 | B25D 11/005 |
| DE | 10162863 | A1 * | 7/2003 | A47B 13/021 |
| DE | 20 2006 006 776 | | 9/2006 | |
| DE | 1 816 417 | | 8/2016 | |
| EP | 0 952 290 | | 10/1999 | |
| EP | 1 707 723 | | 10/2006 | |
| EP | 2204265 | A2 * | 7/2010 | B25B 23/0014 |
| EP | 2 762 666 | | 8/2014 | |
| JP | 62-22279 | | 2/1987 | |
| JP | 2018-508677 | | 3/2018 | |
| WO | 2006/005086 | | 1/2006 | |
| WO | WO-2012095090 | A1 * | 7/2012 | E05F 1/105 |
| WO | WO-2013128223 | A1 * | 9/2013 | B25B 13/481 |
| WO | 2014/134642 | | 9/2014 | |
| WO | 2016/131770 | | 8/2016 | |
| WO | WO-2016131770 | A1 * | 8/2016 | E05D 11/00 |
| WO | WO-2017143379 | A1 * | 8/2017 | E05D 15/401 |
| WO | 2018/060032 | | 4/2018 | |
| WO | WO-2018060032 | A1 * | 4/2018 | E05D 13/1238 |

* cited by examiner

FURNITURE FITTING

BACKGROUND OF THE INVENTION

The present invention relates to a furniture fitting, comprising:

a carrier having at least one substantially flat fastening surface configured to be fixed to a furniture part, at least one actuating portion configured to be moved relative to the carrier, an adjustment device for adjusting a position of the actuating portion relative to the carrier, the adjustment device having at least one actuating element rotatable about a rotational axis, wherein the actuating portion can be adjusted relative to the carrier by exerting a torque to the at least one actuating element, wherein the rotational axis of the actuating element encloses an angle larger than 0° and smaller than 90° to the at least one fastening surface of the carrier.

Moreover, the invention relates to an item of furniture comprising a furniture carcass, at least one furniture part movable relative to the furniture carcass, and at least one furniture fitting of the type to be described.

By the adjustment device of a furniture fitting (for example of a furniture drive, a furniture hinge or a furniture damper), a plurality of parameters of the furniture fitting can be purposefully influenced. For example, it is possible that by the adjustment device, a position of the furniture fitting or of a component of the furniture fitting relative to a furniture part can be adjusted. Moreover, it is possible that with a furniture fitting configured as a furniture damper, a position of the furniture damper relative to a furniture part and/or a damping stroke of the furniture damper and/or a damping power of the furniture damper can be adjusted. Further, it is possible that with a furniture fitting configured as a furniture drive, a force of a spring device applied to an actuating arm assembly of the furniture drive can be adjusted so as to compensate for a weight force of the furniture part to be moved.

EP 0 952 290 A2 discloses a furniture drive having a rotatable actuating element arranged on a front face of the housing, and a spring force acting on the actuating arm assembly can be adjusted by the actuating element. Also known are furniture drives having an actuating element to be operated from the side with the aid of a tool, for example as shown in FIG. 19a of the WO 2006/005086 A1 reference.

In certain mounting situations, difficulties may arise when the actuating element is to be adjusted. This is, for example, the case when the carrier of the furniture fitting is mounted to a sidewall of the furniture carcass in a set-back manner in relation to a front face of the furniture carcass. In such a case, upon an adjustment of the actuating element with the aid of a screwdriver or with a cordless screwdriver, a hand of a person or the drill chuck of the cordless screwdriver would collide with the sidewall of the furniture carcass. Particularly with furniture fittings which have become much smaller over recent years and, therefore, more compact, an adjustment in such mounting situations can be considerably impeded.

Furniture fittings with a rotationally supported actuating element having a rotational axis extending obliquely to a fastening surface of the furniture fitting, are shown, for example, in WO 2018/060032 A1, WO 2014/134642 A1, EP 2 762 666 A1 and EP 1 707 723 A2.

SUMMARY OF THE INVENTION

It is an object of the present invention to propose a furniture fitting of the type mentioned in the introductory part, thereby avoiding the above-discussed drawbacks.

According to the invention, the actuating element is coupled to the actuating portion via an angularly-movable coupling device, the angularly-movable coupling device preferably comprising a ball joint.

In this way, the actuating element can be supported in a rotatory manner in three directions of movement, thereby enabling a plurality of relative positions of the actuating element in order to allow a comfortable and easily accessible actuation.

The rotational axis of the actuating element is configured to be arranged obliquely to a fastening surface of the carrier. The actuating element can be actuated, in a mounted condition of the furniture drive, by obliquely positioning a tool on the actuating element in order to be comfortably accessible and to be easily actuated.

Preferably, the rotational axis of the actuating element encloses an angle larger than 5° and smaller than 80°, preferably an angle larger than 10° and smaller than 50°, in relation to the at least one fastening surface of the carrier.

According to a preferred embodiment, the actuating element is configured to be moved by the angularly-movable coupling device such that the angle, that the rotational axis of the actuating element and the fastening surface of the carrier enclose to one another, can be, preferably continuously, adjusted. In other words, the actuating element—in addition to the rotational movement about the rotational axis—is movably supported relative to the carrier within defined limits. Therefore, at least one or also a plurality of relative positions of the actuating element can be made available in order for the actuating element to be actuated.

The actuating element can be movably-supported relative to the carrier within defined limits in a stepless manner. Alternatively, it is possible that the actuating element can be positioned on at least one or also on a plurality of defined or individually settable positions.

The actuating element can include a tool receiving device for actuating the actuating element with the aid of a tool. The actuating element can be driven by exerting a torque to the tool receiving device with the aid of a tool, for example with a screwdriver or with a cordless screwdriver. The tool receiving device can include, for example, a cross-head form (for example a Pozidriv-profile), a square shaft profile, a hexagonal profile or a six-lobe drive (for example a Torx-profile).

The actuating element can be connected to a shaft, the shaft being supported in a recess in a form-locking manner with radial play.

The actuating element can include at least one friction surface configured to hold the actuating element in at least one relative position in a self-locking manner. For improving the self-locking connection, a spring element can be provided, the spring element pressing the friction surface of the actuating element against a corresponding abutment surface.

BRIEF DESCRIPTION OF THE DRAWINGS

Further details and advantages of the present invention result from the following description of figures, in which.

DETAILED DESCRIPTION OF THE INVENTION

Figure 1A:
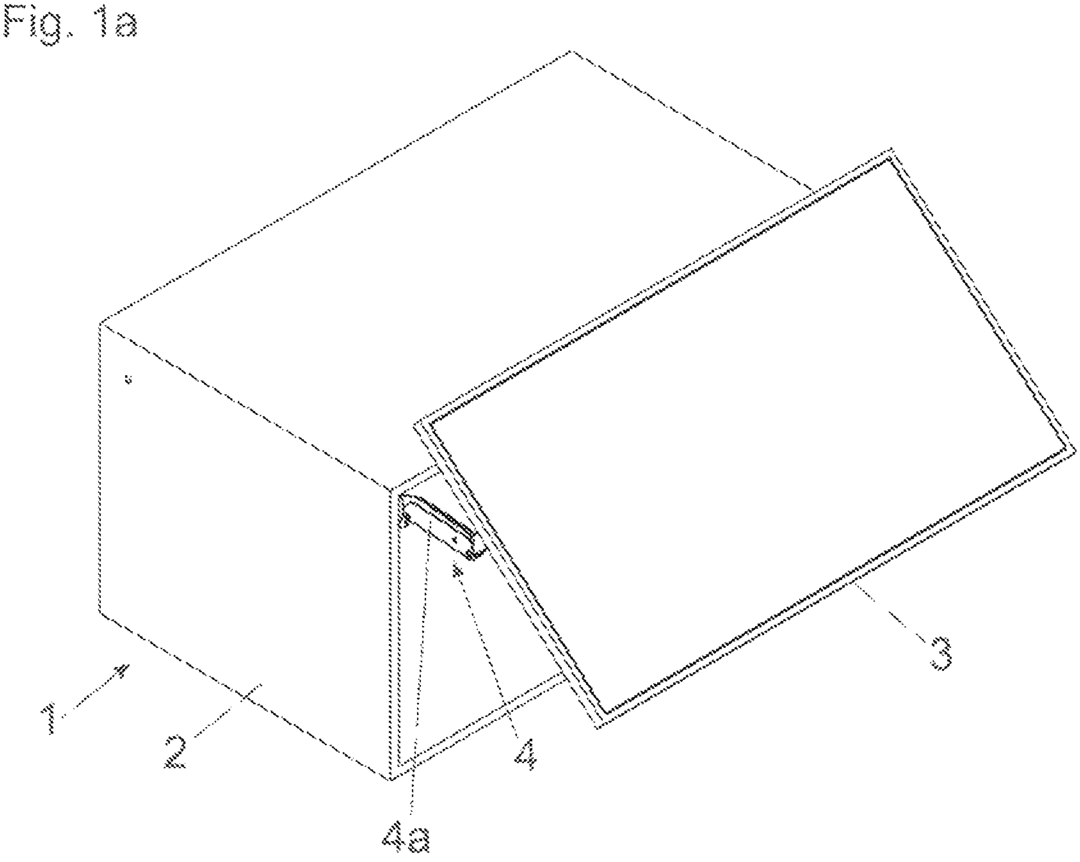
FIG. 1*a*, 1*b* show an item of furniture with a movable furniture part in a perspective view and in a side view.

FIG. 1*a* shows a perspective view of an item of furniture 1 comprising a furniture carcass 2 and a furniture part 3 movable relative to the furniture carcass 2. In the shown embodiment, the depicted furniture fitting 4 is configured as a furniture drive 4*a* for moving the movable furniture part 3. Alternatively, the furniture fitting 4 can be configured as a furniture hinge, as a drawer pull-out guide, as a furniture damper (for example with the piston-cylinder-unit) or as a mounting plate.

Figure 1B:
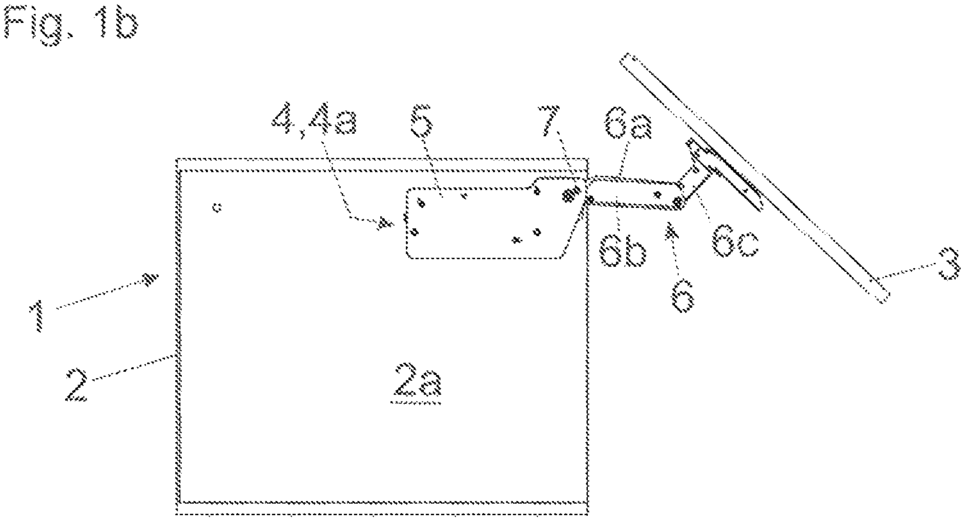

FIG. 1*b* shows the item of furniture 1 in a side view. A carrier 5 of the furniture fitting 4 is fixed to a vertically extending furniture part 2*a* in the form of a sidewall of the furniture carcass 2. The furniture fitting 4 can include an actuating arm assembly 6 having at least one actuating arm 6*a*, the at least one actuating arm 6*a* being pivotally supported about a pivoting axis 7 on the carrier 5. In the shown embodiment, the actuating arm assembly 6 includes a plurality of pivotable actuating arms 6*a*, 6*b*, 6*c* for moving the movable furniture part 3.

Figure 2A:
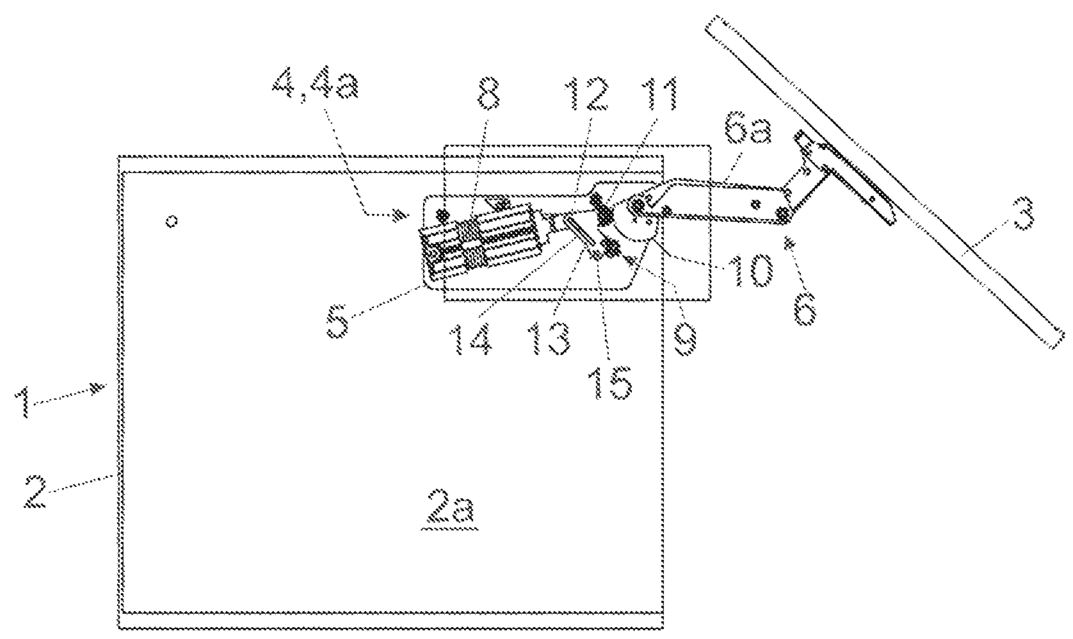
FIG. 2*a*, 2*b* show the furniture fitting mounted to the furniture carcass in a side view and an enlarged detail view thereof.

FIG. 2*a* shows the furniture fitting 4 fixed to the vertically extending furniture part 2*a* in a side view, the furniture fitting 4 being in the form of the furniture drive 4*a*. A spring device 8 is provided for applying a force to the actuating arm assembly 6, the spring device 8 preferably having at least one helical spring configured as a compression spring. By an adjustment device 9 of the furniture hinge 4, a torque of the spring device 8 acting on the actuating arm assembly 6 can be adjusted. The spring device 8 engages on an actuating portion 12, and a position of the actuating portion 12 in relation to the pivoting axis 15 of an intermediate lever 14 can be adjusted by an actuation of the adjustment device 9. The intermediate lever 14 can include a guide 13, for example in the form of an elongated hole, for adjustably supporting the actuating portion 12.

Figure 2B:
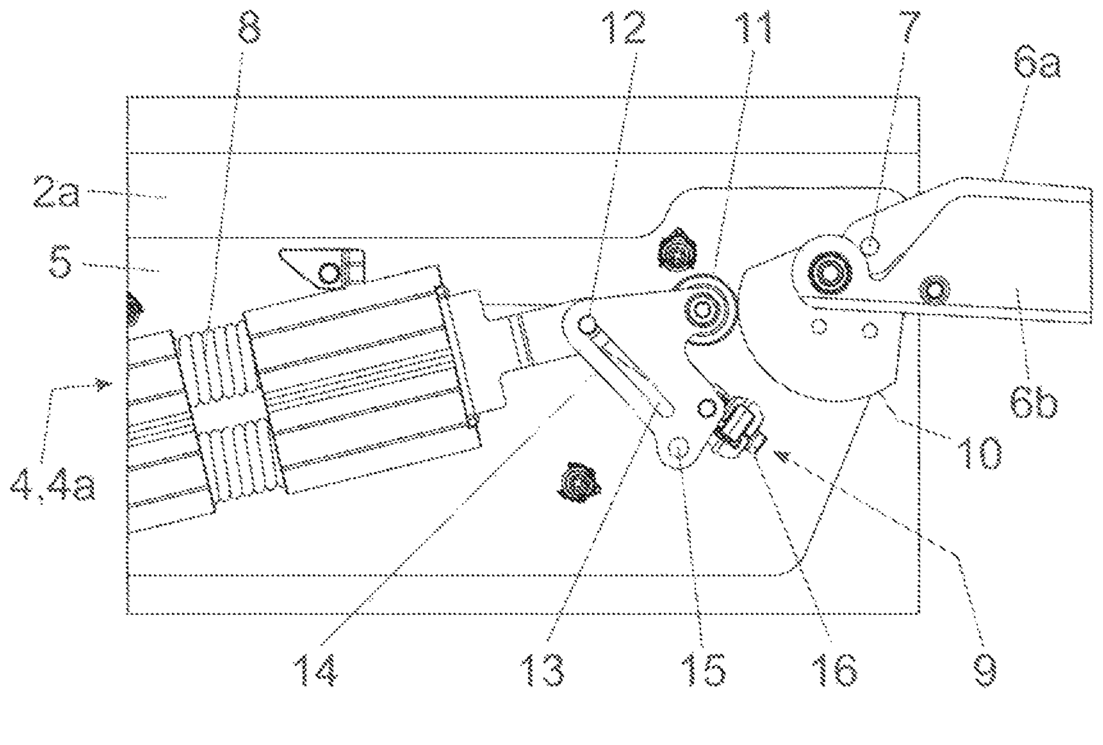

FIG. 2*b* shows the framed region of FIG. 2*a* in an enlarged view. The adjustment device 9 includes at least one rotationally supported actuating element 16. By rotating the actuating element 16 with the aid of a tool 17 (FIG. 3*a*, 3*b*), a position of the actuating portion 12 can be adjusted in or along the guide 13 of the intermediate lever 14 so as to adjust an operative torque of the spring device 8 on the actuating arm assembly 6. The furniture fitting 4 includes a transmission mechanism for transmitting a force of the spring device 8 to the actuating arm assembly 6. The transmission mechanism includes a control curve 10 and a pressure roller 11 pressurized by the spring device 8. The pressure roller 11 is configured to run along the control curve 10 upon a movement of the actuating arm assembly 6. In the shown embodiment, the pressure roller 11 is rotationally supported on the intermediate lever 14, whereas the control curve 10 is formed or arranged on the actuating arm 6*a* configured to be pivotable about the pivoting axis 7. In a mechanical reversal, it is also possible to arrange the pressure roller 11 on the actuating arm 6*a* and to arrange the control curve 10 on the intermediate lever 14.

Figure 3A:
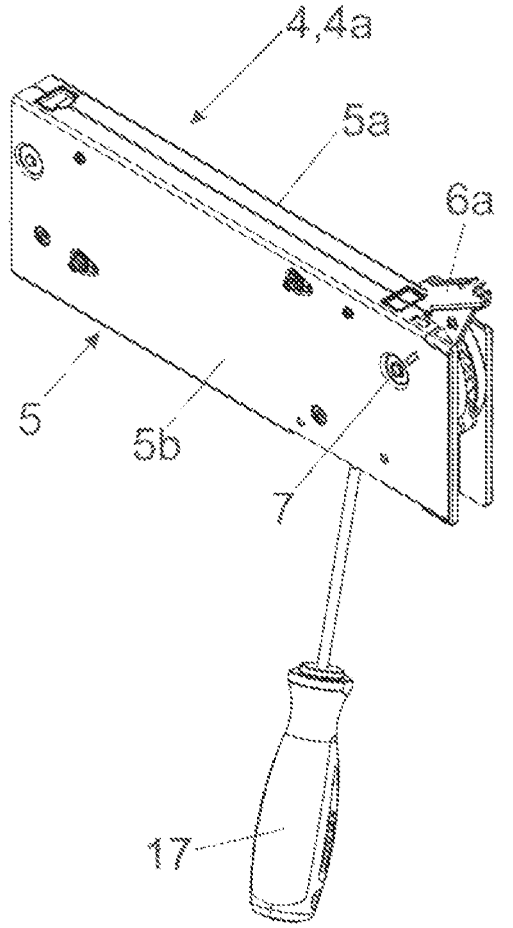
FIG. 3*a*, 3*b* show the furniture fitting in a perspective view and the furniture fitting mounted to the furniture part in a view from the front.

FIG. 3*a* shows the furniture fitting 4 in the form of the furniture drive 4*a* in a perspective view. The carrier 5 of the furniture fitting 4 is preferably configured substantially cuboidal and includes at least one fastening surface 5*a*, 5*b* configured to be fixed to a furniture part 2*a*. The fastening surfaces 5*a*, 5*b* are each configured substantially flat and are mutually spaced from one another in a parallel relationship. The furniture fitting 4 can be fixed via the first fastening surface 5*a* to a first (right-handed) furniture part 2*a*, and can be fixed via the second fastening surface 5*b* to a second (left-handed) furniture part 2*a*. In the shown embodiment, the actuating arm 6*a* pivotable about the pivoting axis 7 is configured to be releasably locked to a further actuating arm 6*b*, 6*c* of the actuating arm assembly 6, and the further actuating arm 6*b*, 6*c* is configured to be connected to the movable furniture part 3. By means of a tool 17, for example a screwdriver, the actuating element 16 of the adjustment device 9 can be rotated so as to adjust an effective torque of the spring device 8 to the actuating arm assembly 6.

The carrier 5 can have a front face and a lower longitudinal side, and the actuating element 16 can be preferably arranged in a region of the front face, in a region of the lower longitudinal side or in a region of the fastening surfaces 5*a*, 5*b*.

Figure 3B:
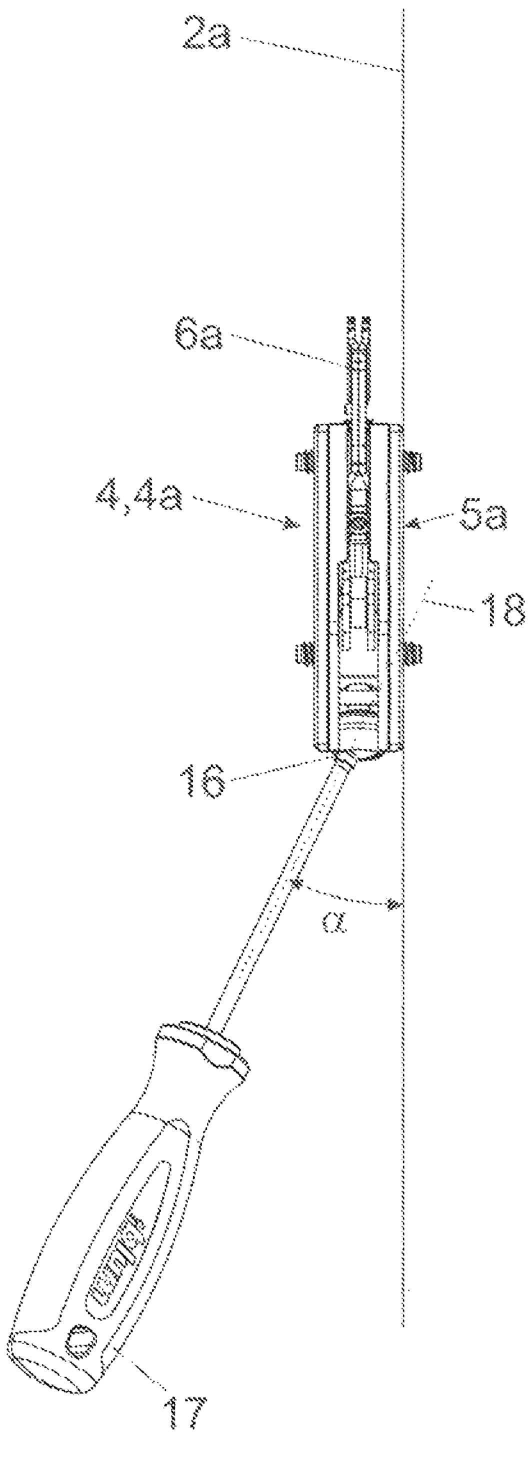

FIG. 3*b* shows the furniture fitting 4 mounted to the furniture part 2*a* via the first fastening surface 5*a* of the carrier 5. The actuating element 16 is rotationally supported about a rotational axis 18, and the rotational axis 18 of the actuating element 16 encloses an angle ($\alpha$) larger than 0° and smaller than 90°, preferably larger than 5° and smaller than 80°, preferably larger than 10° and smaller than 50°, in relation to the at least one fastening surface 5*a* of the carrier 5. In this way, the handle of the tool 17 or the hand of an operator grasping the handle of the tool 17 can be prevented from colliding with the furniture part 2*a*. Therefore, the operating comfort of the actuating element 16 can be improved. This is, in particular, also advantageous when the fastening surfaces 5*a*, 5*b*, for the sake of compact construction of the furniture fitting 4, are arranged with a relatively small mutual distance to one another.

The actuating element 16 is positioned or can be positioned on at least one or on a plurality of defined or settable positions within the angle ($\alpha$). According to an embodiment, the actuating element 16 can be steplessly moved within the defined angle ($\alpha$). Therefore, a variety of positions are available for an operator so as to rotate the actuating element 16 about the rotational axis 18. The actuating element 16 can be supported on an angularly-movable coupling device 20 (FIG. 5*a*), the angularly-movable coupling device 20 preferably including a ball joint. In order to hold the actuating element 16 in a relative position in a self-locking manner, at least one friction surface 23*a* (FIG. 5*a*) can be provided.

The actuating element 16, in a duly mounted condition of the furniture fitting 4, can be arranged to face towards the movable furniture part 3 and in a front region of the carrier 5. In this way, the actuating element 16, in a mounted condition of the furniture fitting 4, can be comfortably adjusted from the front with the aid of the tool 17.

Figure 4:
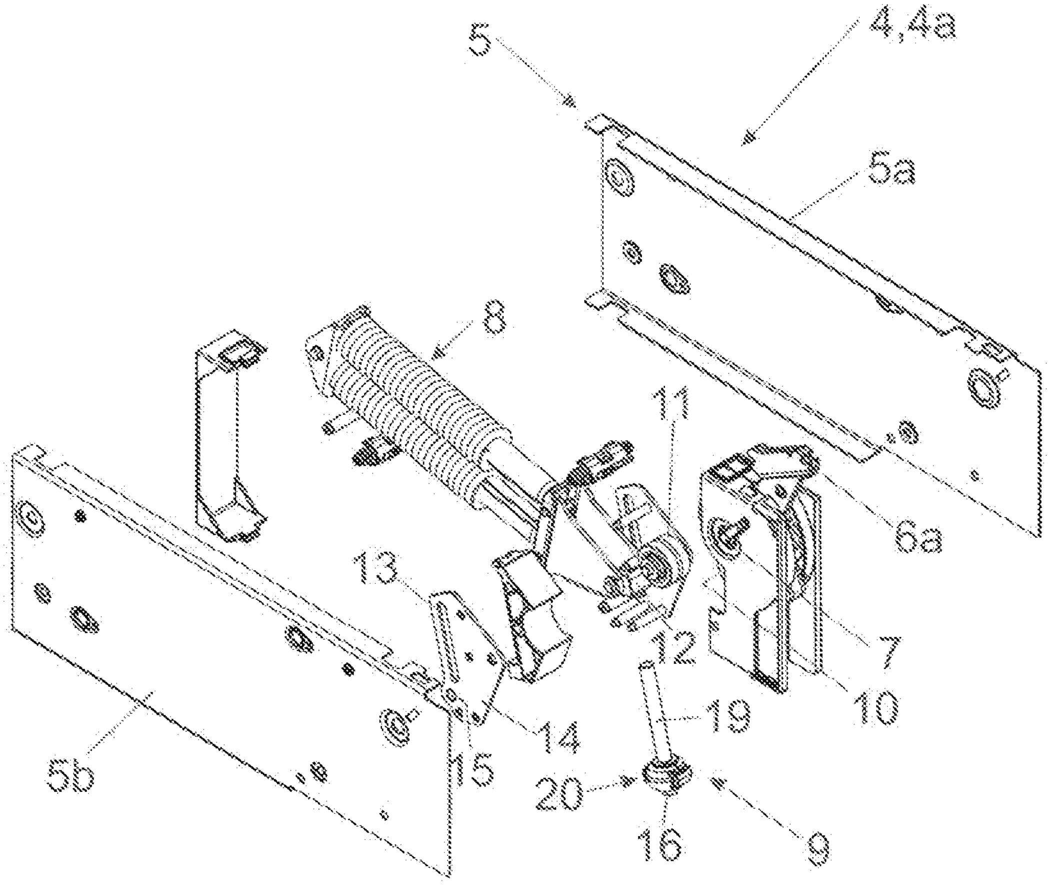
FIG. 4 shows the furniture fitting configured as a furniture drive in an exploded view.

FIG. 4 shows the furniture fitting 4 configured as the furniture drive 4*a* in an exploded view. The carrier 5 includes two mutually spaced fastening surfaces 5*a*, 5*b* configured to be fixed to a furniture part 2*a*. The spring device 8 for applying a force to the actuating arm 6*a* and the adjustment device 9 for adjusting a force of the spring device 8 to the actuating arm 6*a* are arranged between the fastening surfaces 5*a*, 5*b*. The spring device 8 can include at least one or a plurality of compression springs, the compression springs being supported on the actuating portion 12 to be adjusted by the adjustment device 9. By a rotation of the actuating element 16 about the rotational axis 18 (FIG. 3*b*), the actuating portion 12 is movable in a first direction towards the pivoting axis 15 of the intermediate lever 14, and is movable in a second direction away from the pivoting axis 15 of the intermediate lever 14. In this way, the torque applied by the spring device 8 to the actuating arm 6*a* can be adjusted.

The actuating element 16 is connected to a threaded portion 19 via an angularly-movable coupling device 20, and the threaded portion 19 can be rotated by rotating the actuating element 16. The actuating portion 12 is in threading engagement with the threaded portion 19, and the actuating portion 12 is movable along the threaded portion 19 by a rotation of the actuating element 16. The threaded portion 19 has a longitudinal axis which can be aligned substantially parallel in relation to the at least one fastening surface 5*a*, 5*b* of the carrier 5. The pressure roller 11 is rotationally supported on the intermediate lever 14, and the pressure roller 11 is configured to run along the control curve 10 of the actuating arm 6*a* upon a movement of the actuating arm 6*a* about the pivoting axis 7.

Figure 5A:
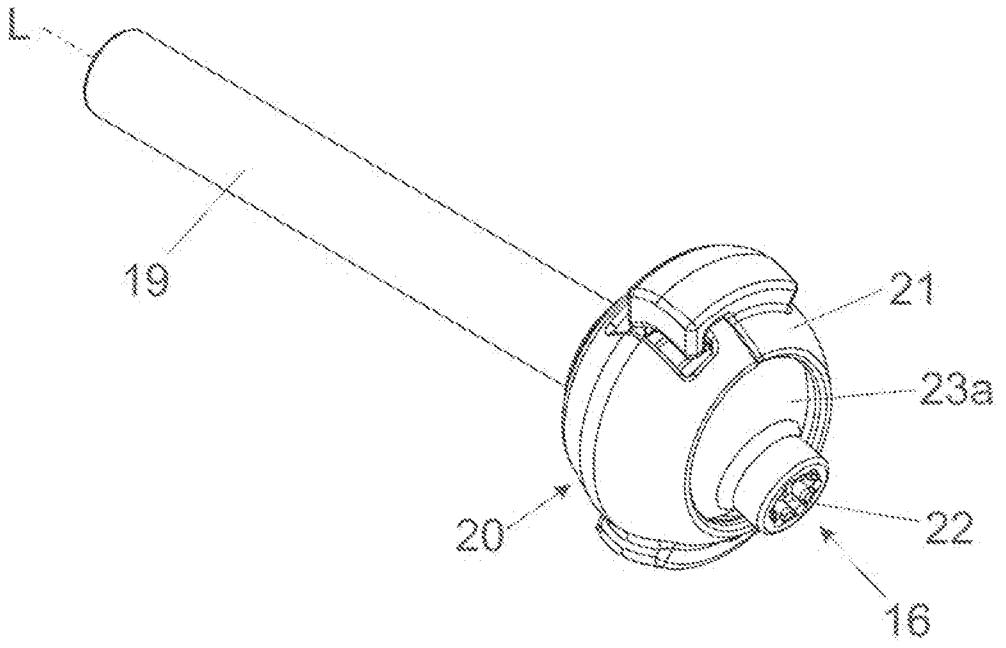
FIG. 5*a*-5*c* are different views of the actuating element coupled to a threaded portion via an angularly-movable coupling device.

FIG. 5*a* shows the actuating element 16 which is coupled to the threaded portion 19 via the angularly-movable coupling device 20 for the adjustable support of the actuating portion 12. The actuating element 16 can include a tool receiving device 22 for actuating the actuating element 16 with the aid of a tool 17. A housing 21 is provided for partially supporting the actuating element 16, and the angularly-movable coupling device 20 is received within the housing 21.

Figure 5B:
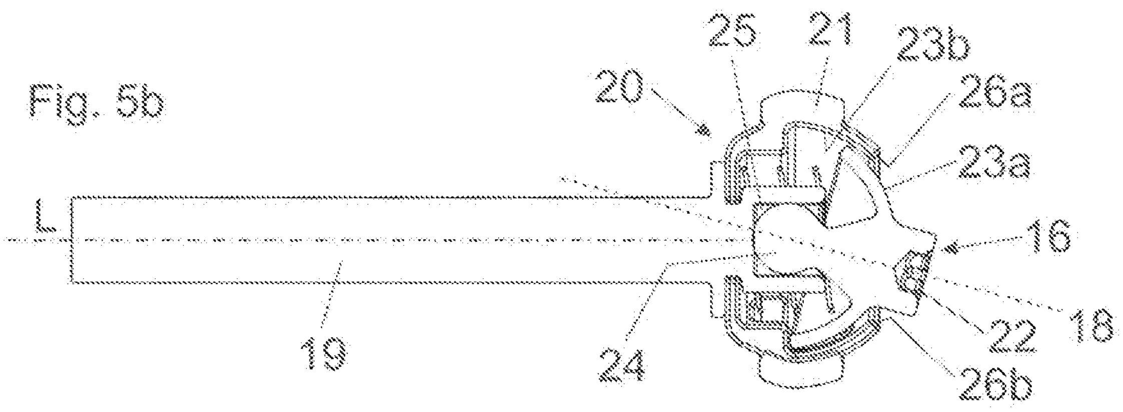

FIG. 5*b* shows a cross-sectional view of FIG. 5*a* in a first position of the actuating element 16. The actuating element 16 is connected to a shaft 24, the shaft 24 being supported in a recess 25 in a form-locking manner with radial play. The actuating element 16 can include at least one, preferably spherical segment shaped, friction surface 23*a* for holding the actuating element 16 in at least one relative position in a self-locking manner. In the shown figure, the friction surface 23*a* connected to the actuating element 16 co-operates with a corresponding abutment surface 23*b* of the housing 21. For limiting an angle-movement of the actuating element 16, at least one abutment 26*a*, 26*b* is provided which are each arranged on the housing 21 in the shown embodiment.

The threaded portion 19 has a longitudinal axis (L), and the rotational axis 18 of the actuating element 16 and the longitudinal axis (L) of the threaded portion 19 extend non-parallel to one another. For example, the rotational axis 18 of the actuating element 16 and the longitudinal axis (L) of the threaded portion 19 can enclose an angle of between 10° and 60° to one another.

Figure 5C:
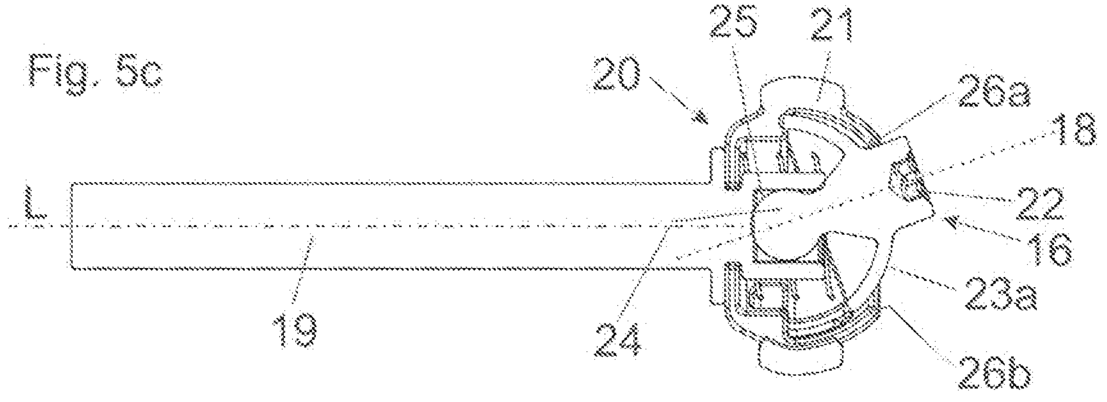

FIG. 5*c* shows a cross-sectional view of FIG. 5*a* in a second position of the actuating element 16. In the shown figure, the actuating element 16 bears against the abutment 26*a*, so that a further pivoting movement (that is to say an exceedance of the maximum permissible angle ($\alpha$)) of the actuating element 16 can be prevented. It can be seen that the position of the rotational axis 18 in FIG. 5*b* and the position of the rotational axis 18 in FIG. 5*c* deviate from one another.

Figure 6:
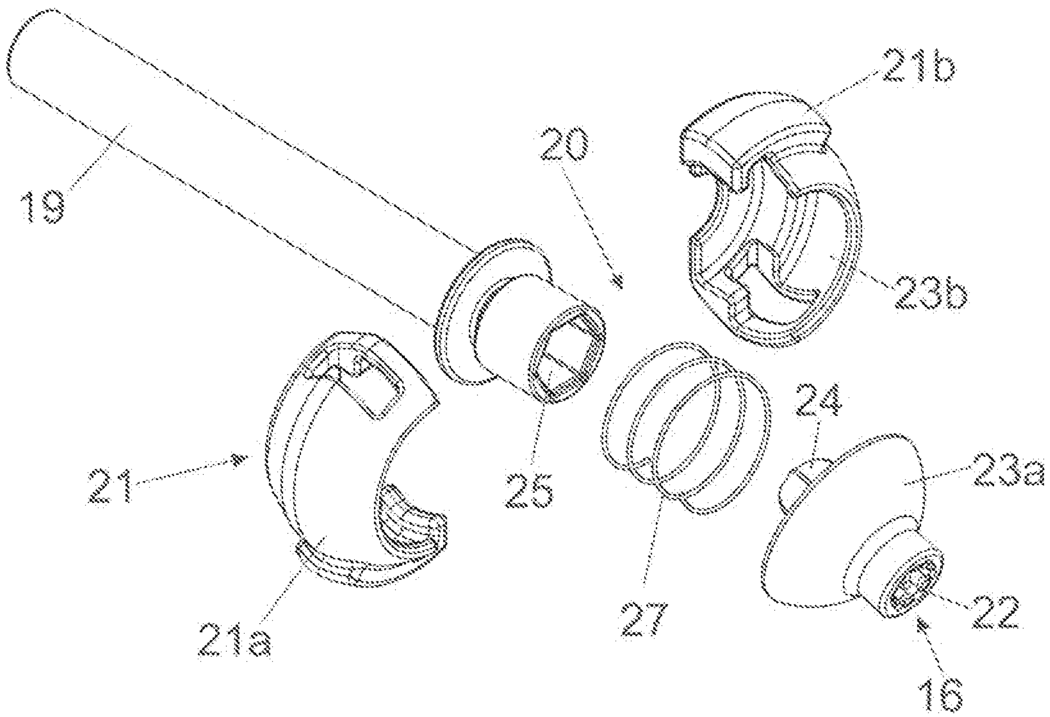
FIG. 6 shows the embodiment according to FIG. 5*a*-5*c* in an exploded view.

FIG. 6 shows the embodiment according to FIGS. 5*a*-5*c* in an exploded view. The threaded portion 19 includes an end region having the recess 25 in which the shaft 24 of the actuating element 16 can be arranged in a form-locking manner with radial play. The housing 21 includes two half-shells 21*a*, 21*b* configured to be connected to one another, and the actuating element 16 with the friction surface 23*a* is received therebetween. By a spring element 27, for example in the form of a compression spring, the friction surface 23*a* of the actuating element 16 can be pressed against the abutment surface 23*b* of the housing 21, preferably the half-shells 21*a*, 21*b*, whereby the self-locking connection of the actuating element 16 can be improved.

The present invention has been explained with the aid of a furniture fitting 4 in the form of the furniture drive 4*a* for adjusting a force of the spring device 8 to the actuating arm assembly 6. Of course, it is also possible to apply the described support of the actuating element 16 to other types of furniture fittings 4 (for example drawer pull-out guides, furniture hinges, furniture dampers, etc.). Thereby, it can be provided that by a rotation of the actuating element 16, a position of the furniture hinge or a position of a movably-supported component of the furniture hinge can be adjusted. Alternatively, it is possible that by a rotation of the actuating element 16, a position of the furniture damper and/or a damping stroke of the furniture damper and/or a damping power of the furniture damper can be adjusted.

The invention claimed is:

1. A furniture fitting, comprising:

a carrier having a substantially flat fastening surface to be fixed to a furniture part;

an actuating portion configured to be moved relative to the carrier; and an adjustment device configured to adjust a position of the actuating portion relative to the carrier, the adjustment device having an actuating element rotatable about a rotational axis, the actuating portion being adjustable relative to the carrier by exerting a torque on the actuating element, wherein the rotational axis of the actuating element forms an angle larger than 0° and smaller than 90° with respect to the fastening surface of the carrier, wherein the actuating element is coupled to the actuating portion via an angularly-movable coupling device.

2. The furniture fitting according to claim 1, wherein the rotational axis of the actuating element encloses an angle larger than 5° and smaller than 80° in relation to the at least one fastening surface of the carrier.

3. The furniture fitting according to claim 1, wherein the actuating element is configured to be moved by the angularly-movable coupling device to adjust the angle formed by the rotational axis of the actuating element and the fastening surface of the carrier.

4. The furniture fitting according to claim 1, wherein the actuating element includes a tool receiving device to allow actuation of the actuating element with the aid of a tool.

5. The furniture fitting according to claim 1, wherein the actuating element is connected to a shaft, the shaft being supported in a recess in a form-locking manner with radial play.

6. The furniture fitting according to claim 1, wherein the actuating element includes a friction surface configured to hold the actuating element in at least one relative position in a self-locking manner.

7. The furniture fitting according to claim 1, further comprising an abutment configured to limit an angle of the actuating element.

8. The furniture fitting according to claim 1, further comprising a housing configured to partially support the actuating element.

9. The furniture fitting according to claim 1, further comprising a spring element configured to press the actuating element against an abutment surface.

10. The furniture fitting according to claim 1, wherein the furniture fitting is configured as a furniture drive for moving the furniture part movably-supported relative to a furniture carcass, the furniture fitting comprising:

an actuating arm assembly arranged on the carrier, the actuating arm assembly including a movably-supported actuating arm configured to move the movable furniture part; and a spring device configured to apply a force to the actuating arm assembly, the spring device co-operating with the actuating portion, wherein the adjustment device is configured to adjust the position of the actuating portion so as to adjust a force of the spring device applied to the actuating arm assembly, the adjustment device including a threaded portion for adjustably supporting the actuating portion, wherein the actuating portion is configured to be moved along the threaded portion by rotating the actuating element about the rotational axis to adjust the force of the spring device applied to the actuating arm assembly.

11. The furniture fitting according to claim 10, wherein the threaded portion has a longitudinal axis aligned substantially parallel to the fastening surface of the carrier.

12. The furniture fitting according to claim 10, wherein the rotational axis of the actuating element and a longitudinal axis of the threaded portion extend non-parallel to one another.

13. The furniture fitting according to claim 10, further comprising a transmission mechanism for transmitting the force of the spring device to the actuating arm assembly, the transmission mechanism including a control curve and a pressure roller to be pressurized by the spring device, wherein the pressure roller is configured to run along the control curve upon a movement of the actuating arm assembly.

14. The furniture fitting according to claim 10, wherein the spring device includes a helical spring for applying a force to the actuating arm assembly.

15. An item of furniture comprising:

a furniture carcass:

a furniture part movable relative to the furniture carcass; and the furniture fitting according to claim 1, wherein the carrier of the furniture fitting is fixed to the furniture carcass via the substantially flat fastening surface.

16. The furniture fitting according to claim 1, wherein the angularly-movable coupling device is a ball joint.

17. The furniture fitting according to claim 2, wherein the rotational axis of the actuating element forms an angle larger than 10° and smaller than 50° in relation to the at least one fastening surface of the carrier.

18. The furniture fitting according to claim 3, wherein the actuating element is configured to be moved by the angularly-movable coupling device to steplessly adjust the angle formed by the rotational axis of the actuating element and the fastening surface of the carrier.

19. The furniture fitting according to claim 12, wherein the rotational axis of the actuating element and the longitudinal axis of the threaded portion form an angle of between 10° and 60°.

20. The furniture fitting according to claim 14, wherein the helical spring is a compression spring.

* * * * *